Sept. 23, 1969    F. LINDER    3,468,471
BACTERIAPROOF PLASTIC BAG FOR ARTICLES TO BE STERILIZED
Filed June 24, 1966
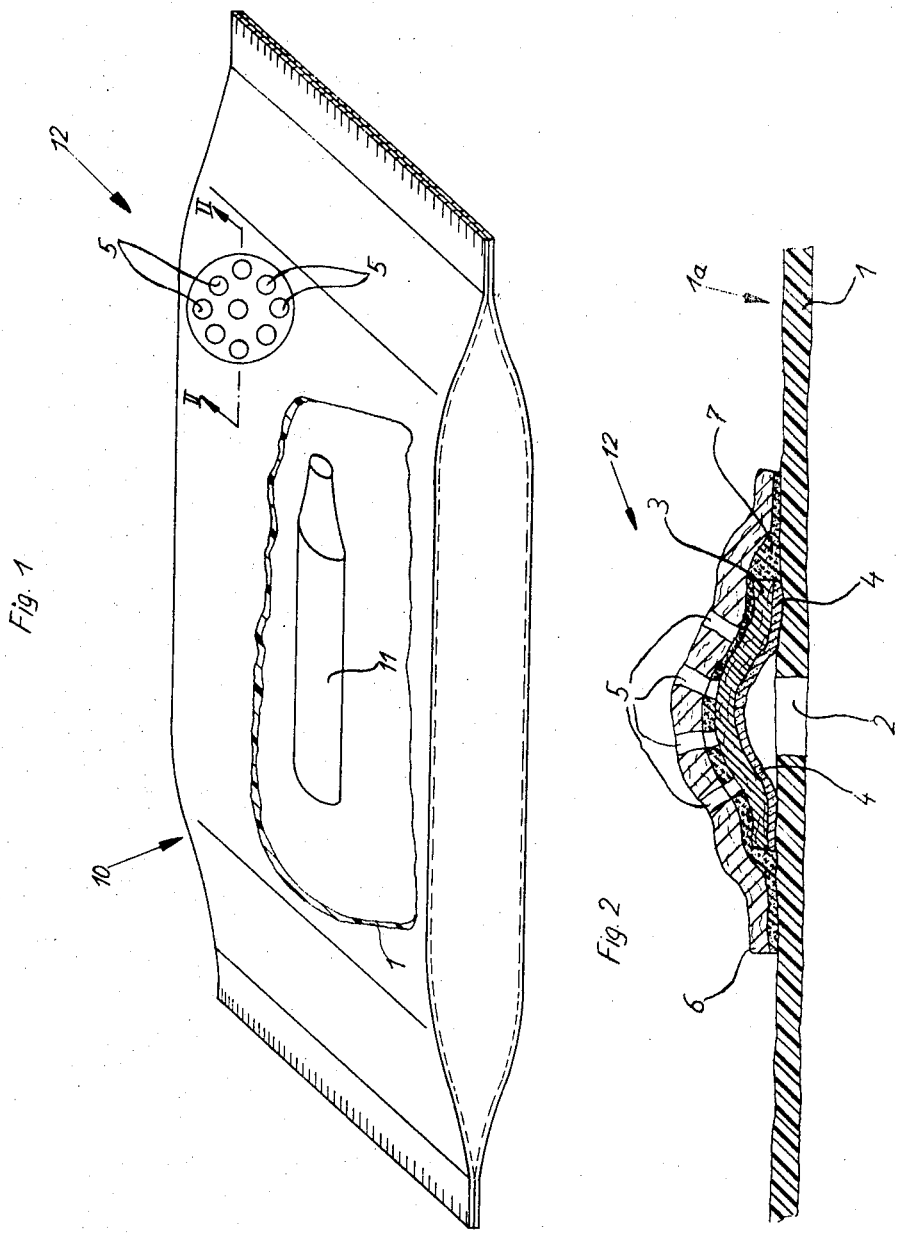
INVENTOR:
FRITZ LINDER
by
Jacob L. Rollin
ATTORNEY 3,468,471
Patented Sept. 23, 1969

3,468,471
BACTERIAPROOF PLASTIC BAG FOR ARTICLES TO BE STERILIZED
Fritz Linder, Skarhamn, Sweden
Filed June 24, 1966, Ser. No. 560,181
Claims priority, application Germany, June 24, 1965,
L 50,973
Int. Cl. B65d *31/14*
U.S. Cl. 229—62.5    10 Claims

ABSTRACT OF THE DISCLOSURE

A bacteriaproof plastic bag for articles to be sterilized is provided with a valve opening and a bacteria filter device which covers the valve opening and acts as a valve. The bacteria filter device consists of a gas-permeable layer of material and an adhesive coating secured thereto. The adhesive coating when heated to a predetermined temperature becomes a gas-permeable liquid permitting the passage of steam into the bag through the valve opening. When cooled, the adhesive coating solidifies thus closing the valve opening. A cover provided with passages for the steam through the filter device is secured to the bag by a heat-resistant adhesive.

---

This invention relates to a plastic bag which can be closed in a way that no bacteria can enter, preferably consists of a material which is gas-permeable at increased temperatures and serves as a container for articles, especially medical instruments and textile fabrics, which are to be sterilized in a steam-autoclave or the like.

It is the object of the invention to provide a plastic bag with a simple and cheap valve which is gas and steam-permeable at increased temperatures and closes the plastic bag at normal temperatures in a way that no bacteria can enter.

This object is attained according to the present invention by providing a bacteriaproof plastic bag for articles, especially medical instruments and textile fabrics, which are to be sterilized in a steam-autoclave or the like, which comprises at least one valve opening in at least one bag side and a bacteria filter device covering said valve opening, said bacteria filter device consisting of a gas-permeable layer and a layer of an adhesive which, when heated, becomes a gas-permeable liquid, and a heat-resistant holding means which secures the bacteria filter device to the bag side.

An embodiment of the invention will now be described by way of example and with reference to the accompanying drawings, in which:

FIG. 1 is a perspective view of a bacteriaproof plastic bag according to the invention, showing a filter device and containing the cylinder of an injection syringe, and FIG. 2 is a vertical section, on an enlarged scale and on the line II—II of FIG. 1, through the filter device and one side of the plastic bag.

FIG. 1 shows a bacteriaproof plastic bag 10 containing a medical instrument 11 which in the embodiment illustrated is the cylinder of an injection syringe. The plastic bag 10 preferably consists of "Nylon" (registered trademark) and has in at least one of its sides 1 at least one filter device 12. As FIG. 2 shows, the filter device 12 co-operates with a valve opening 2 provided in the side 1 and covered by a bacteria filter. The bacteria filter comprises a gas-permeable layer 3 which in the illustrated embodiment consists of a piece of paper, preferably wrapping paper. The surface of the gas-permeable layer 3 facing the outer surface 1a of the side 1 is coated with a water-soluble adhesive 4 having a melting point of about 40° C. which, however, can be varied in accordance with the actual temperatures at which the plastic bag 10 is to be stored. The bacteria filter is covered by a holding sheet material 6 provided with a plurality of holes 5. The holding sheet material 6 is covered with a layer of heat-resistant adhesive 7 on its entire surface facing the bacteria filter. The rim of the holding sheet material 6 projecting beyond the bacteria filter sticks to the side 1 of the plastic bag 10 by means of this heat-resistant adhesive 7.

Water-soluble adhesives with a melting point of about 40° C. are known in the art. The same applies to heat-resistant adhesives which are heat-resistant to such a degree that they are hardly affected by the sterilizing temperatures.

As shown in FIG. 2, the holes 5 extend through the layer of heat-resistant adhesive 7 up to the gas-permeable layer 3. The filter device 12 is arranged on the outer surface 1a of the side 1 of the plastic bag 10.

The plastic bag 10 proposed by the invention is used in the following manner:

The article to be sterilized, e.g. the cylinder of an injection syringe is placed into the bag, the bag is then closed and put in a steam-autoclave, where the plastic bag 10 is exposed to saturated steam in a known manner in order to sterilize the contents of the bag. Owing to the high temperatures, pores open in the plastic bag and allow the sterilizing steam to pass into the plastic bag and sterilize the article therein.

Since the plastic bag 10 and the article to be sterilized are cool in the beginning, a condensation of water occurs after the steam has entered. Then the steam-autoclave is evacuated in a known manner, e.g. by means of an associated vacuum pump. This causes the condensed water in the plastic bag to vapourize quickly. The steam thus formed cannot pass quickly enough through the pores forming under the influence of the high temperatures. By the present invention it is now possible to make the bacteria filter permeable to air and steam when the entire plastic bag 10 and particularly the layer of water-soluble adhesive 4 of the filter device 12 are exposed to high temperatures. During the heating period the bacteria filter is reliably held in proper position on the side 1 by the heat-resistant holding foil 6 or the heat-resistant adhesive 7. An increase in volume of the air inside the bag caused by increased temperatures can be compensated by air escaping through the bacteria filter. Later on when the autoclave is evacuated, steam can escape from the inside of the plastic bag 10 in the same way and also such steam which is generated by the condensation water in the plastic bag 10. Thus an undesired inflation which would cause danger to the plastic bag 10 is avoided.

When at the end of the sterilizing procedure the temperature of the plastic bag 10 recovers to the normal surrounding temperature or when the plastic bag is exposed to normal atmospheric pressure, the water-soluble adhesive 4 of the bacteria filter, which is liquid and gas-permeable during the heating period, is consolidated and condensed. The water-soluble adhesive 4 might possibly be pressed against the outer surface 1a of the side 1 of the bag by the outside atmospheric pressure so that a particularly safe closure is achieved.

The holes 5 in the holding sheet material 6 and in the heat-resistant adhesive 7 provide the necessary escape holes.

The plastic bag 10 is thus provided with a valve which is gas and steam permeable at increased temperatures and which at a given normal temperature closes the plastic bag 10 or its valve opening 2 so that no bacteria can enter. An undesired inflation of the plastic bag 10, e.g. as a consequence of the increase in volume of the enclosed air during the heating procedure or as a consequence of the steam formed during the evacuation, is avoided by very simple means.

The dripping point of the water-soluble adhesive coating 4 is so chosen that it will not or only to an insignificant extent drip off the gas-permeable layer 3.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims therefore intended to be embraced therein.

I claim:

1. A bacteriaproof plastic bag for articles, especially medical instruments and textile fabrics, which are to be sterilized in a steam-autoclave or the like, comprising at least one valve opening in at least one bag side and a bacteria filter device covering said valve opening, said bacteria filter device consisting of a gas-permeable layer of material, an adhesive coating on said layer of material which, when heated to a predetermined temperature, becomes a gas-permeable liquid, and a heat-resistant holding means which fastens the bacteria filter device to the bag side.

2. A bag as claimed in claim 1, wherein said bag is made of a material which is gas-permeable at increased temperatures.

3. A bag as claimed in claim 1, wherein the gas-permeable layer of the bacteria filter device consists of paper.

4. A bag as claimed in claim 1, wherein the gas-permeable layer of the bacteria filter device consists of wrapping paper.

5. A bag as claimed in claim 1, wherein the adhesive of the bacteria filter device is water-soluble.

6. A bag as claimed in claim 1, wherein said adhesive coating of the bacteria filter device has a melting point of about 40° C.

7. A bag as claimed in claim 1, wherein a holding sheet serves as the holding means for the bacteria filter device, said holding sheet covering said bacteria filter device on the outer surface and being provided with a plurality of holes, the rim of said holding sheet projecting beyond said bacteria filter device and adhering to said plastic bag side by means of a heat-resistant adhesive.

8. A bag as claimed in claim 7, wherein the holding sheet consists of paper.

9. A bag as claimed in claim 7, wherein the holding sheet is covered with a heat-resistant adhesive on the entire surface facing the bacteria filter device, said adhesive being also provided with a plurality of holes in the region of the bacteria filter device.

10. A bag as claimed in claim 1, wherein the layer of an adhesive is provided on that side of the gas-permeable layer which faces the side of the bag.

References Cited

UNITED STATES PATENTS

| | | | |
|---|---|---|---|
| 2,627,341 | 2/1953 | Morgan | 206—63.2 |
| 2,633,284 | 3/1953 | Moffett et al. | |
| 2,634,856 | 4/1953 | Perkins | 206—63.2 |
| 2,676,702 | 4/1954 | Whitefoot. | |
| 2,947,415 | 8/1960 | Garth | 206—63.2 |
| 3,123,210 | 3/1964 | Hermanson et al. | 206—63.2 |
| 3,229,813 | 1/1966 | Crowe et al. | 206—63.2 |
| 3,247,957 | 4/1966 | Kemble | 206—63.2 |

JOSEPH SCOVRONEK, Primary Examiner

BARRY S. RICHMAN, Assistant Examiner

U.S. Cl. X.R.

21—56, 61, 91, 93, 94, 104; 206—63.2